United States Patent [19]
Barnett

[11] 3,836,426

[45] Sept. 17, 1974

[54] STEEL TIRE CORD ASSEMBLY

[75] Inventor: Thomas A. Barnett, Raleigh, N.C.

[73] Assignee: Monsanto Company, St. Louis, Mo.

[22] Filed: Dec. 29, 1972

[21] Appl. No.: 319,257

[52] U.S. Cl. .................. 161/170, 156/179, 161/60, 161/143, 161/148, 161/216
[51] Int. Cl. ........................ B32b 5/16, D04h 1/74
[58] Field of Search ............ 161/60, 142, 143, 144, 161/148, 170, 216; 156/179, 178

[56] References Cited
UNITED STATES PATENTS

| | | | |
|---|---|---|---|
| 3,214,320 | 10/1965 | Lappala et al. | 161/143 |
| 3,290,854 | 12/1966 | MacMurray | 161/144 |
| 3,307,690 | 3/1967 | Bond et al. | 161/144 |
| 3,472,730 | 10/1969 | Frigstad | 161/144 |
| 3,649,434 | 3/1972 | Mortenson | 161/60 |

Primary Examiner—William J. Van Balen

[57] ABSTRACT

A wire assembly particularly useful as a packaging and transport assembly for steel tire cord is disclosed.

3 Claims, 4 Drawing Figures

PATENTED SEP 17 1974　　　　　　　　　　　　　　　　3,836,426

STEEL TIRE CORD ASSEMBLY

BACKGROUND OF THE INVENTION

This invention relates to a wire assembly form useful for transporting wire in a predetermined relationship. Typically, steel tire cord is fed to the calendering operation from a plurality ot creels or in the form of a loosely woven cord fabric. Both methods are considered expensive and require the cord to be carefully packaged to resist corrosion between cord manufacture and tire manufacture. This invention relates to a novel packaging assembly for wire and a novel feed form for the calendering operation.

STATEMENT OF THE INVENTION

This invention relates to a wire assembly wherein a plurality of wires in parallel spaced relationship are sandwiched between two thermoplastic films and the films are bonded together at intervals along the space or rivet between adjacent wires. Wire can be conveniently packaged and transported in this form. When wire is fed to the calendering operation where rubber is coated about the wire the thermoplastic films can be stripped away.

THE DRAWING

DETAILED DESCRIPTION OF THE INVENTION

Figure 1:
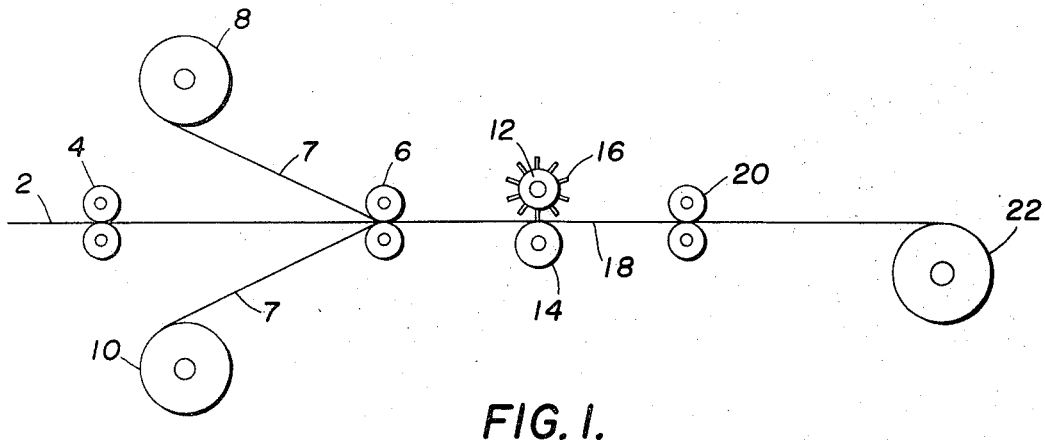
FIG. 1 is a schematic of the process for making the wire assembly of the invention.

Referring to FIG. 1 a plurality of spaced parallel wires is passed between grooved guide rolls 4 and on to a second set of guide rolls 6. Thermoplastic film 7, slightly wider than the width of the several wires, taken from supply rolls 8 and 10 is passed into the second set of guide rolls 6. The layered assembly from guide rolls 6 is passed on to a pair of meshed rolls 12 and 14. Roll 12 has heated spikes 16 at spaced intervals. The hot spikes 16 mesh with the surface of roll 14 along the spaces or rivets between the wires and heat bonds the two thermoplastic films situated therebetween. The bonded assembly 18 is then passed between the nip of rolls 20 to a take-up roll 22.

Figure 3:
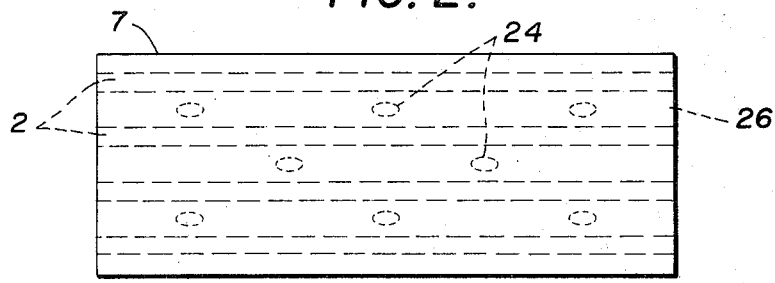
FIG. 3 is a plan view of the wire assembly of the invention.
Figure 4:
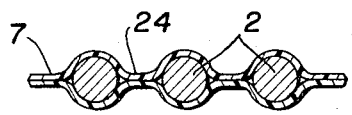
FIG. 4 is a section view of a wire assembly of the invention.

FIGS. 3 and 4 depict different views of the assembly wherein wires 2 are situated in spaced parallel relationship, desirably along a common plane, between films 7 having bonds 24 at desired intervals along the spaces 26 between the wires. If desired, a continuous selvedge bond can be made between the two films at the outermost wires.

Figure 2:
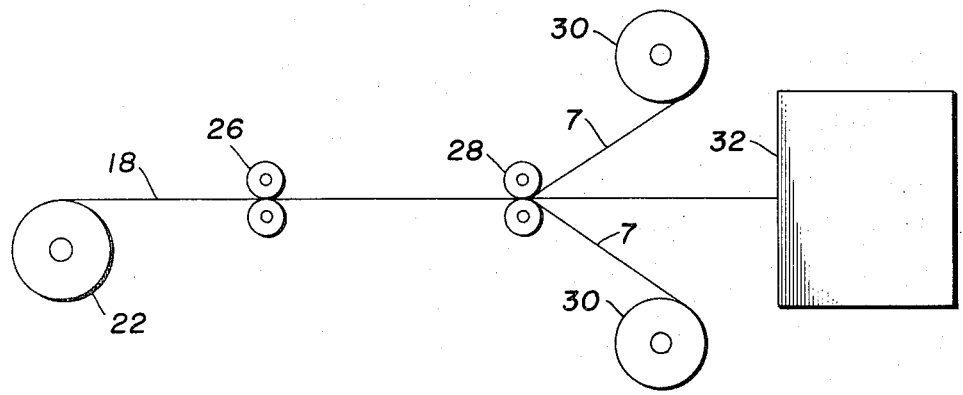
FIG. 2 is a schematic illustrating the use of a steel tire cord assembly of the invention.

FIG. 2 depicts a particular use of the assembly of this invention wherein the assembly 18 is taken from take-up rolls passed between guide rolls 26 and 28 after which the film 7 is stripped from both sides of the wire by stripper rolls 30. The wire 2 is then passed into calendar 32 where it is coated with rubber on both sides. Although the invention finds particular use as a steel tire cord packaging and delivery system, it may be used for wires, strands and cables of other metals as well.

The nature of the thermoplastic films is not critical as long as they possess sufficient tensile properties to hold the assembly together and can be bonded by thermal or ultrasonic bonding techniques. Polyethylene and polypropylene film are desirable thermoplastic films for use in this invention. If desired the film can have incorporated various antioxidants, antiozonants, UV stabilizers and the like for the protection of the wire.

I claim:

1. A wire assembly comprising a first thermoplastic film and a second film having a plurality of wires in spaced parallel relationship therebetween, said first and second film being bonded together at intervals between the spaced wires.

2. The assembly of claim 1 wherein the wires are steel cords.

3. The assembly of claim 1 wherein the films are polyethylene or polypropylene films.

* * * * *